Feb. 6, 1951  A. B. NEWTON  2,540,958
AIR DISCHARGE CONTROL
Filed Aug. 1, 1947  3 Sheets-Sheet 1

INVENTOR.
Alwin B. Newton
BY
Harness and Harris
ATTORNEYS.

Feb. 6, 1951 A. B. NEWTON 2,540,958
AIR DISCHARGE CONTROL
Filed Aug. 1, 1947 3 Sheets-Sheet 2

INVENTOR.
Alwin B. Newton
BY
Harness and Harris
ATTORNEYS.

INVENTOR.
Alwin B. Newton.
BY
Harness and Harris
ATTORNEYS.

UNITED STATES PATENT OFFICE 2,540,958

AIR DISCHARGE CONTROL

Alwin B. Newton, Dayton, Ohio, assignor to Chrysler Corporation, Highland Park, Mich., a corporation of Delaware Application August 1, 1947, Serial No. 765,435

19 Claims. (Cl. 236—1)

This invention relates to air conditioning apparatus and more particularly to temperature responsive means for controlling the admission of conditioned air to a room.

My copending application, Serial No. 720,081, which matured into Patent No. 2,533,175 on December 5, 1950, describes a means for utilizing the movement of air being delivered by an air conditioning system as the motive power for opening or closing damper means controlling the delivery of air to a room.

It is a principal object of this invention to provide an improved apparatus for accomplishing this result in which the temperature responsive elements are substantially unloaded and are adapted to control the operation of the apparatus without being required to shift large moving components thereof.

It is a further object of the invention to provide means in an apparatus of this kind for compensating for the local heating or cooling effects of a discharge air stream on a room temperature responsive thermostat.

One of the main objects of this invention is to provide a simplified control for automatically reversing the operation of the damper means in response to seasonal changes in the temperature of air delivered by the system. For example, in the winter when warm air is being delivered to a room by the air conditioning system a low room temperature will demand an opening of the damper means to admit heated air to the room. In the summer when cold air is being delivered by the system a low room temperature is a signal that the damper means close to stop the discharge of additional cold air to the room. An improved means for automatically effecting this seasonal changeover in the control of the apparatus constitutes one of the principal objects of this invention.

It is an additional object of the invention to provide automatic means adapted to alter the effect of a remote room temperature responsive thermostat on a damper means. The improved season changeover control is able to reverse the operating effect of a room temperature responsive thermostat upon the apparatus even though that thermostat be positioned at a remote location.

It is also an object of the invention to provide means for automatically establishing the optimum control point for a room thermostat under both summer and winter operation conditions. The control point is the critical temperature at which a room temperature responsive thermostat is adapted to signal for a change in delivery of conditioned air to the room. The provision of automatic means for compensating the room temperature thermostat for both summer and winter operating conditions without changing the manual adjustment thereof is incorporated in the improved apparatus to be described herein.

It is a further object of the invention to provide means for assuring that the damper means controlling the discharge of air to a room will assume a wide open position when the temperature of the air delivered by the system is substantially equal to the room temperature. This assures the admission of fresh air to the room under conditions when a change in temperature is not required.

Other objects and advantages of the invention will be apparent from the following description taken in connection with the accompanying drawings in which.

Figures 1, 2:
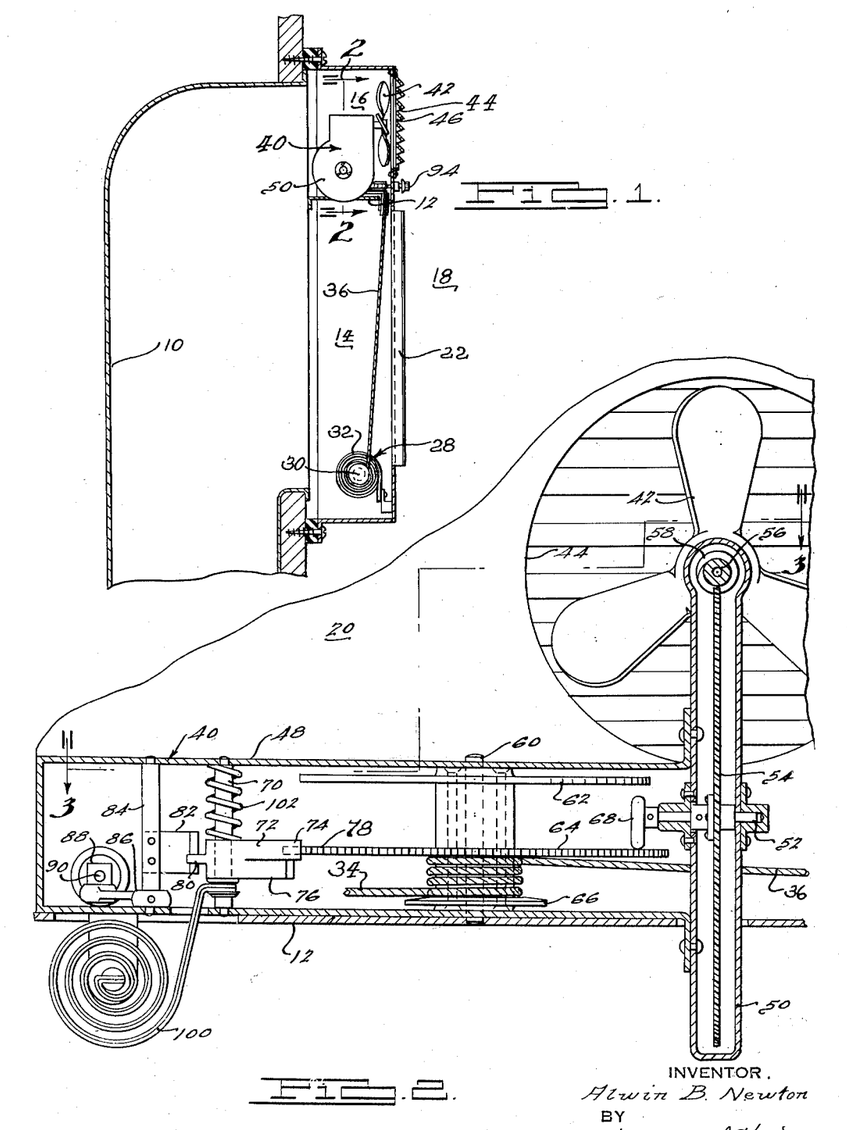
Fig. 1 is a vertical section of an individual air duct showing a damper therein and control apparatus adapted to regulate the position of the damper.
Fig. 2 is a vertical sectional view taken substantially on the line 2—2 of Fig. 1.

A duct 10 is provided for delivering air from an air conditioning apparatus to a room. A housing 20 is adapted to cover the end portion of the duct 10 and is secured to the wall of the room. The housing 20 is provided with a partition 12 which divides it into a compartment 14 and a compartment 16. The compartment 14 is adapted to deliver air to a room 18 for heating or cooling thereof. The compartment 16 is preferably positioned above the compartment 14 and arranged in fluid flow relationship with the duct 10 so that a portion of the air being delivered by the duct 10 to the room 18 will pass through the compartment 16. The housing 20 is provided with an opening 22 which is aligned with the compartment 14 and through which air is discharged from the compartment 14 to the room 18. A damper which is preferably in the form of a curtain 28 is adapted to close off opening 22. The curtain 28 preferably is mounted on a roll member 30. The curtain 28 has one end thereof permanently affixed to the housing 20. By raising the roll member 30 the curtain 28 may be spread across the opening 22 to obstruct the passage of air from compartment 14 to room 18. The fluid flow connection of compartment 16 with duct 10 is unimpaired by the curtain so that the operation of the curtain 28 has no effect on the passage of air from duct 10 to compartment 16. A pair of cords 34 and 36 wound upon opposite ends of the roll member 30 extend upwardly into compartment 16.

Means to actuate the cords 34 and 36 to raise and lower the curtain 28 are provided in compartment 16. An apparatus generally designated by the numeral 40 is positioned within compartment 16 and supported on partition 12. The apparatus 40 includes a turbine 42 which is operatively connected to the apparatus in a manner to be described herein and which is positioned in axial alignment with an opening 44 provided in the housing 20 so that air from the duct 10 may be constantly discharged to the room 18 through the compartment 16 and opening 44 to actuate the turbine 42. A suitable grille member 46 may be provided to cover the opening 44.

The apparatus 40 is carried by a frame 48. The frame 48 is supported by the partition 12. A gear housing 50 is supported by the frame 48 adjacent one end thereof. A shaft 52 is rotatably supported in the gear housing 50 and has a gear 54 keyed thereto and contained within the housing 50. The turbine 42 is keyed to a shaft 56 which is rotatably supported by the gear housing 50. The shaft 56 carries a worm gear 58 which meshes with the gear 54 so that rotation of the turbine 42 is imparted to the shaft 52 by means of the shaft 56, worm gear 58, and gear 54. A vertical shaft 60 is rotatably supported by the top and bottom portions of the frame 48. A first disc 62 is keyed to the shaft 60. A second disc 64 is keyed to the shaft 60 in parallel relationship with the disc 62. A pulley 66 is keyed to the shaft 60 and has portions of the cords 34 and 36 wound thereon. The shaft 52 has keyed thereto an eccentric friction element 68 which is positioned between the disc 62 and the disc 64. When the shaft 52 is rotated by means of the turbine 42 and gear 54 the friction element is rotated and it alternately frictionally engages the flat surfaces of the discs 62 and 64. As air is discharged from the duct 10 between the blades of the turbine 42 the turbine is rotated in a counterclockwise direction as shown in Fig. 2. This imparts a rotation to the eccentric friction element 68 such that the lower portion thereof moves away from the observer as viewed in Fig. 2, or in a counterclockwise direction as viewed in Fig. 3. When the friction element 68 is in frictional engagement with the disc 64 the disc 64 and shaft 60 are rotated in a counterclockwise direction as viewed in Fig. 3. The eccentric friction element then releases disc 64 and frictionally engages disc 62 to rotate the latter in a clockwise direction as viewed in Fig. 3. There is thus imparted to the shaft 60 and spool 66 a series of alternate clockwise and counterclockwise increments of motion. It should be noted that for a portion of each revolution the eccentric 68 is not in contact with either disc 62 or 64. During this time the continued rotation of turbine 42 stores energy in the eccentric friction element which is then available to drive the disc which is next contacted.

Figure 3:
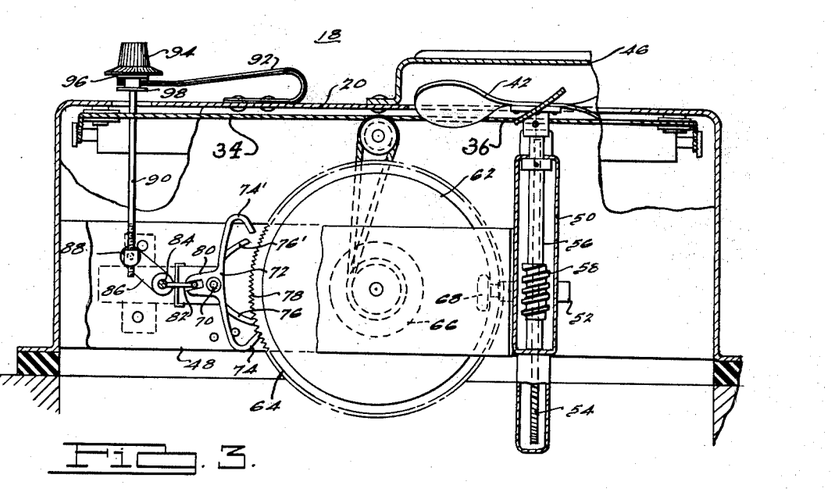
Fig. 3 is a plan view partly in section taken substantially on the line 3—3 of Fig. 2.

Means are provided to utilize portions of the reciprocation of shaft 60 to selectively raise and lower the curtain 28 to thereby control the discharge of air from the duct 10 to the room 18. A shaft 70 is mounted in a vertical position between the upper and lower portions of the frame 48. A yoke 72 has formed thereon an upper and a lower ratchet element. The upper ratchet element comprises a pair of pawls 74 and 74' and the lower ratchet element comprises a pair of pawls 76 and 76'. The pawls project forwardly from the body portion of the yoke and are adapted to be selectively engaged with serrations 78 provided on the periphery of the disc 64. The yoke 72 is rotatably mounted on the shaft 70. A bifurcated element 80 extends rearwardly from the body portion of the yoke and is adapted to straddle an operating lever 82. The operating lever 82 is keyed to a vertical shaft 84 which is rotatably mounted in the frame 48. A lever 86 has one end thereof keyed to the shaft 84. The other end of the lever 86 carries a threaded nut 88. An adjusting rod 90 is threaded into the nut 88. A room temperature responsive thermostatic element 92 has one end thereof secured to the housing 20. The free end of the bimetallic element 92 has a manual adjustment knob 94 rotatably mounted thereon. The knob 94 is keyed to the adjustment rod 90. Suitable collars 96 and 98 are provided on the knob 94 to straddle the bimetallic element 92 so that rotation of the rod 94 and rod 90 adjusts the relationship between the bimetallic element 92 and the lever 82. Movement of the bimetallic element 92 caused by changes in temperature in the room 18 are transmitted through the rod 90, lever 86, shaft 84, and lever 82 to the yoke 72 which is rotated upon the shaft 70 so that an individual pawl of one of the pairs of pawls is engaged with the serrations 78 of the disc 64. In Fig. 3 the pawl 74 is shown as engaging serrations 78. A change in the room temperature would rotate the yoke 72 in a clockwise direction about the shaft 70 so that the pawl 74 would be disengaged from the serrations 78 and the pawl 74' engaged therewith. Referring to Fig. 3 the pawl 74 is adapted to obstruct only counterclockwise rotation of the disc 64 while the pawl 74' is adapted to obstruct only clockwise rotation of the disc 64. When neither pawl is in engagement the discs harmlessly oscillate. When one of the pawls is in engagement with the serrations 78 the rotation of the eccentric friction element 68 is able to produce rotation of shaft 60 in one direction only. Since it only frictionally engages the discs 62 and 64 it will slip relative to one of the surfaces thereof when motion in the corresponding direction is obstructed by a pawl on the yoke 72. With the pawl 74 in engagement as in Fig. 3 so that counterclockwise rotation of disc 64 is prevented the eccentric friction element 68 will rotate the shaft 60 when it engages the disc 62 but the friction element will slip relative to the disc 64. Each rotation of the shaft 60 inducted by movement of the disc 62 will move one or more serrations 78 past the pawl 74. The summation of these increments of motion will by rotating the spool 66, gradually lower the cords 34 and 36 and the curtain 28. When the room temperature changes sufficiently to cause the bimetallic element 92 to rotate the yoke 72 so that the pawl 74' engages the serrations 78 only a counterclockwise movement of the disc 64 and spool 66 is permitted. This winds up the cords 34 and 36 and lowers the curtain 28. The room temperature, therefore, determines the position of the curtain 28 and the amount of air delivered from the duct 10 to the room 18.

The above description which includes only reference to the upper ratchet element including pawls 74 and 74' is predicated upon the assumption that the air conditioning system delivers warm air to the duct 10. It is, however, common practice to use the same ducts for the delivery of cool air in the summertime. Means are provided herein to automatically reverse the effect of the room thermostat 92 upon the position of the curtain 28. This is accomplished by a second bimetallic thermostatic element 100 which is exposed to the air delivered by duct 10 through chamber 14. The lower ratchet element formed by pawls 76 and 76' is in an inoperative position during the winter months when heated air is delivered by the system. However, when the yoke 72 is lifted on the vertical shaft 70 the pawls 74 and 74' are lifted above the disc 64 and the pawls 76 and 76' are substituted therefor in the plane of the disc 64. The yoke 72 is slidably mounted relative to the shaft 70. One end of the bimetallic thermostatic element 100 is connected to the yoke 72 and adapted to lift the yoke 72 relative to the disc 64 when the bimetallic element 100 is cooled by the presence of cold air in the duct 10. A spring 102 is provided in concentric relation to the shaft 70 to yieldably resist the action of the bimetallic element 100. The lower pair of pawls 76 and 76' are divergent and engage the opposite face of individual serrations 78 from the face engaged by the corresponding pawl in the upper pair. Referring to Fig. 3, it is clearly illustrated that if the engagement of the serrations 78 by the pawls 76 and 76' is substituted for the engagement thereof by the pawls 74 and 74', the permissible direction of rotation of disc 64 is reversed. Thereby the rotation of the spool 66 and the direction of movement of cords 34 and 36 are reversed for a given position of the room temperature responsive bimetallic element 92.

The room temperature responsive bimetallic element 92 is unloaded temporarily each time a pawl moves from one serration to another on the disc 64. This minimizes distortion thereof due to mechanical loading of the bimetallic element by associated components. No heavy moving parts must be shifted by the bimetallic element 92 or the bimetallic element 100. This feature constitutes an improvement over the apparatus shown in my copending application, Serial No. 720,081.

Figure 6:
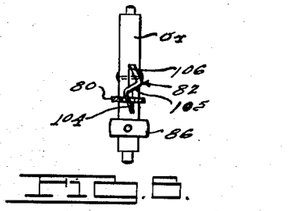
Fig. 6 is an elevation of the operating lever taken on the line 6—6 of Fig. 5.

The operating lever 82 may be provided with a curvature as illustrated in Fig. 6. One result which may be achieved by such a curvature is that the local heating or cooling effect of the discharge airstream on the room temperature responsive bimetallic element 92 may be compensated for. The bifurcated portion 80 of the yoke 72 straddles the operating lever 82. The position of the yoke 72 relative to the shaft 70 is altered a predetermined amount as the temperature of the air delivered by the duct 10 changes. The curvature of lever 82 rotates yoke 72 as the latter is raised or lowered by thermostat 100. The slope of the curvature imparted to the operating lever 82 as shown in Fig. 6 is preselected.

By dividing the curvature of the lever 82 into laterally displaced portions 104 and 106 which are connected by an offset portion 105 the relationship of the bimetallic element 92 to the yoke 72 may be altered a preselected amount when a season changeover is made from delivering warm air to delivering cold air. It is a well known fact that human comfort requires a slightly cooler room temperature under winter conditions than under summer conditions. The progress of the bifurcated portion 80 of the yoke 72 to the left in Fig. 6 across the offset portion 105 of the operating lever 82 automatically provides such an adjustment in response to a material change in the temperature of the air delivered by the duct 10.

During the heating season or winter months to further compensate for heat radiation to cold walls human comfort requires a slight increase in room temperature as the outside temperature falls. The portion 104 is so shaped that its adjustment of operating lever 82 accomplishes this result as well as compensating for the effects of delivered air temperature on the room temperature responsive thermostat 92.

Figure 4:
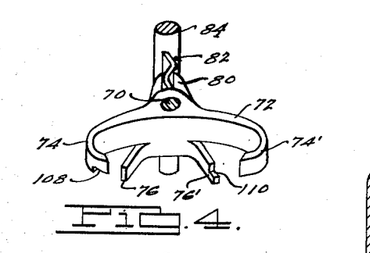
Fig. 4 is a perspective view of the ratchet element showing notches in some of the teeth thereof.
Figure 5:
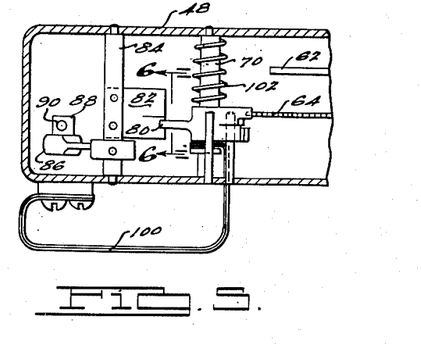
Fig. 5 is a partial vertical sectional view differing from Fig. 2 in that modifications are incorporated in the apparatus.

It is desirable to have the apparatus deliver air to the room for ventilation under conditions where the room air temperature is equal to the delivered air temperature. These conditions occur when the temperature of the delivered air is in the range of about 70° to 80° Fahrenheit since this is the usual range for a comfortable room temperature. It has been found that it is possible to assure that the curtain 28 will be open under these conditions. This is accomplished by so constructing those pawls of the yoke 72 which are associated with a closing movement of the curtain 28 that these pawls are inoperative when the temperature of air delivered by the duct is in the range of 70° to 80° Fahrenheit, for example. The pawls 74 and 76' are the pawls which in their respective seasons are adapted to so obstruct the rotation of the disc 64 in one direction that a closing of the curtain 28 is effected. The lower portion of pawl 74 is notched at 108 and the upper portion of pawl 76' is notched at 110. The depth of the slots is preselected so that the disc 64 is aligned with these slots throughout all vertical movements of the yoke 72 under the influence of bimetallic element 100 in the preselected delivered air temperature range of 70° to 80° Fahrenheit. The spool 66 cannot, therefore, be so rotated as to close curtain 28 as long as the delivered air temperature is within the preselected range. All movements obtained during this interval are in a direction tending to open the curtain 28 and, therefore, the curtain will eventually assume and maintain an open position under these conditions. The room 18 will be ventilated even though the temperature thereof is not altered by the discharge of air from duct 10.

Figure 7:
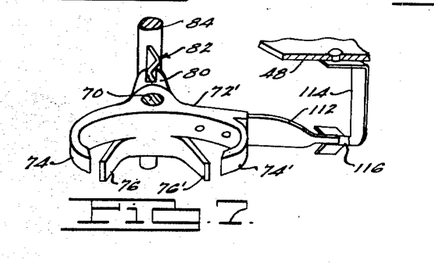
Fig. 7 is a perspective view showing a modified form of the ratchet element.

A modified form of control which assures that the curtain 28 will be open when the delivered air temperature is approximately equal to the normal room temperature is illustrated in Fig. 7.

A yoke 72' is provided with pawls 74 and 74' and the pawls 76 and 76'. The pawls are not notched as previously discussed with reference to Fig. 4. Instead a leaf spring 112 is secured to the yoke 72'. A bracket 114 is supported by the frame 48. The bracket 114 carries an abutment element 116. When the yoke 72' is moved vertically on the shaft 70 by means of expansion and contraction of the bimetallic element 100 the spring 112 moves through vertical positions in which it is aligned with the abutment element 116. By preselecting the locations of the spring 112 and abutment element 116 the alignment of these parts is effected in a predetermined temperature range of air delivered by the system. When the spring 112 is aligned with the abutment element 116 rotation of the yoke 72' in one direction under the influence of bimetallic element 92 is prevented. This makes it impossible for a pawl such as pawl 74 to engage the serrations of disc 64 during the interval when the temperature of the delivered air is in the predetermined range. This performs the same function as notch 108 and prevents curtain 28 from closing when the delivered air temperature is within the predetermined range.

Figure 8:
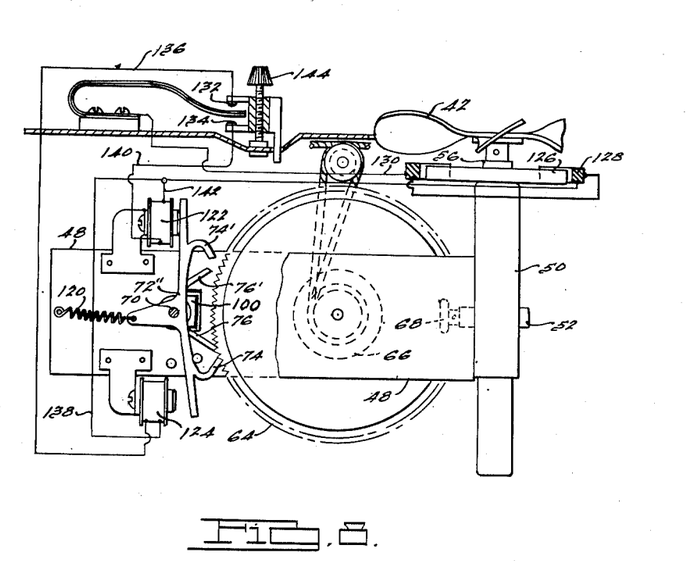
Fig. 8 is a partial plan view of a modified apparatus.

A modified apparatus for controlling the rotation of the yoke 72 and its associated pawls relative to the shaft 70 is illustrated in Fig. 8. A yoke 72'' is urged to a neutral position by a spring 120 which connects a portion of the yoke to the frame 48. A pair of solenoids 122 and 124 are supported by frame 48. Each solenoid is positioned adjacent one end of yoke 72''. A source of electric power is provided to selectively energize the solenoids 122 and 124. A permanent magnet 126 is keyed to shaft 56 which is rotated by turbine 42. A field coil 128 is supported in concentric relation to the magnet 126. A line 130 connects the field coil with the bimetallic element 92. The electric power may be obtained from another source, if desired. A pair of terminals 132 and 134 are positioned in spaced relation to the bimetallic element 92 so that movement of the element 92 will cause the element to engage one or the other of the terminals. Terminal 132 is connected by line 136 with solenoid 124. Line 138 connects solenoid 124 with a field coil 128. A line 140 connects terminal 134 with solenoid 122. A line 142 provides an electrical connection from solenoid 122 to the field coil 128. Electrical energy generated by the rotation of the turbine 42 is thus selectively delivered to the solenoid 122 or the solenoid 124 depending upon the position of the bimetallic element 92. When the room temperature is such that the bimetallic element contacts the terminal 192 the solenoid 124 is energized and the yoke 72'' rotated in a clockwise direction. When the room temperature is such that the bimetallic element 92 contacts terminal 134 the solenoid 122 is energized and the yoke 72'' rotated in a counterclockwise direction. The rotation of the yoke 72'' is utilized to selectively engage individual pawls with serrations on the disc 64 as described above with reference to Fig. 3. A manual adjustment knob 144 is provided to adjust the relationship between the bimetallic element 92 and the terminals 132 and 134. A particular advantage of this modification is that thermostat 92 may be positioned at a remote location and still have its relation to yoke 72'' controlled by bimetallic thermostat 100.

Figure 9:
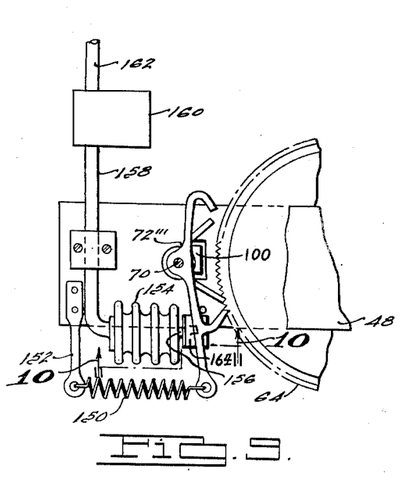
Fig. 9 is a partial plan view of a modified apparatus.

Another means of controlling the rotation of a yoke 72''' in response to changes in room temperature is illustrated in Fig. 9. The yoke 72''' has a spring 150 secured to one end thereof. The other end of the spring 150 is connected to a stationary object such as a bracket 152. The spring urges the yoke 72''' to rotate in a clockwise direction relative to the shaft 70. A pneumatic device in the form of a bellows 154 is provided with a plunger 156 adapted to engage a portion of the yoke 72''' to rotate the yoke in a counterclockwise direction when the bellows is extended. The bellows 154 is operatively connected by a tube 158 to a conventional pneumatic thermostat 160. A tube 162 connects thermostat 160 to a source of supply of air under pressure. Thermostat 160 opens and closes a valve connecting lines 162 and 158. The controlled rotation of the yoke 72''' is used to selectively engage individual pawls carried by the yoke 72''' with serrations provided on the disc 64 as described above with reference to the Fig. 3 apparatus.

Figure 10:
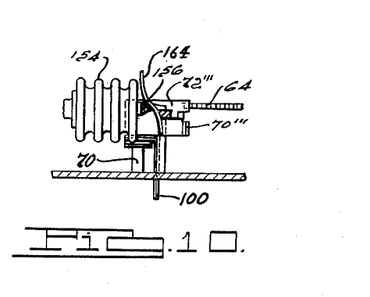
Fig. 10 is a view taken on the line 10—10 of Fig. 9.

The seansonal changeover control apparatus associated with bimetallic thermostat 100 may be combined with the apparatus shown in Figs. 8, 9, and 10 to operate as described with reference to Fig. 2. The yoke 72''' of Figs. 9 and 10 is perferably provided with a curved plate 164 adapted to be engaged by the plunger 156 of the bellows 154 and adapted to be moved vertically relative thereto by a thermostat 100 as described with reference to Fig. 2. The curvature of the plate 164 serves the same purpose as the curvature of lever 82.

I claim:

1. In an apparatus for controlling the discharge of air from an air supply passage to a room, means dividing the outlet for said passage into first and second air discharge openings, a second means having a first position adapted to close said first opening and a second position adapted to open said first opening and a third means deriving energy from the movement of air discharged from said second opening to actuate said second means, said third means comprising a first movable element, driving mechanism operable to reciprocate said element in a first direction and in a second direction in response to movement of air through said second opening, and temperature responsive control means adapted to selectively utilize movements of said element in said second direction to move said first means to said first position and utilize movements of said element in said second direction to move said second means to said second position.

2. In an apparatus for controlling the discharge of air from an air supply passage having first and second discharge outlets, a first means having a plurality of positions adapted to restrict in varying degree the discharge of air from said first outlet, driving means powered by said air supply and adapted to position said first means in response to the temperature of said room, said driving means comprising a turbine positioned to be rotated by the movement of air through said second outlet, a rotatable shaft, a pair of parallel plates secured to said shaft, an eccentric element positioned between said plates and adapted to be rotated by said turbine and to alternately yieldably engage said plates to thereby tend to alternately rotate said shaft in a first direction and in a second direction, a room temperature responsive element, means controlled by said temperature responsive element and adapted to selectively obstruct rotation of said shaft in said first direction, in said second direction and in neither direction and means operatively connecting said shaft and said first means.

3. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a reciprocable element, a temperature responsive element, means controlled by said temperature responsive element and adapted to selectively obstruct movement of said reciprocable element in one direction, means tending to impart a reciprocating movement to said reciprocable element in opposition to said obstructing means, means adapted to transmit motion from said reciprocable element to said first means, and means responsive to the temperature of air in said passage and adapted to reverse the selectivity of said first temperature responsive element when cold air is substituted for warm air in said passage as an incident to change in the season of the year.

4. An apparatus for controlling the discharge of air from an air supply passage to a room comprising a first means having a plurality of positions adapted to restrict in varying degree the discharge of air from said air supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately yieldably engage said discs to thereby tend to alternately rotate said shaft in a first direction and in a second direction, an engageable means associated with said discs, a ratchet element, a pair of ratchet pawls carried by said ratchet element and adapted to be selectively engaged with said engageable means, one of said pawls when engaged with said engageable means being adapted to obstruct rotation of said discs and rotatable shaft in a first direction and the other of said pawls when engaged with said engageable means being adapted to obstruct rotation of said discs and rotatable shaft in a second direction, means connecting said temperature responsive element and said ratchet element and adapted to selectively engage said pawls with said engageable means thereby to selectively obstruct rotation of said discs and rotatable shaft in either direction whereby said first means is positioned by the summation of interrupted movements of said shaft in its unobstructed direction and the duration and direction of movement of said first means is controlled by said temperature responsive element.

5. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately yieldably engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said engageable means whereby the two temperature responsive elements control the position of said first means.

6. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately yieldably engage said discs to thereby tend to alternately rotate said shaft in a first direction and in a second direction, one of said discs being provided with a serrated peripheral portion, a ratchet element, a pair of ratchet pawls carried by said ratchet element and adapted to selectively engage said serrated portion of said disc at different angles, means connecting said temperature responsive element and said ratchet element and adapted to selectively engage said pawls with said serrated peripheral portion thereby to selectively obstruct rotation of said discs and rotatable shaft in either direction whereby said first means is positioned by the summation of interrupted movements of said shaft in its unobstructed direction and the duration and direction of movement of said first means is controlled by said temperature responsive element.

7. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, one of said discs being provided with a serrated peripheral portion, a first ratchet element, a second ratchet element, each of said ratchet elements comprising a pair of pawls, the pawls of one of said ratchet elements being divergent and the pawls of the other ratchet element being convergent, a second temperature responsive element adapted to position said first ratchet element for selective engagement of its pawls with said serrated portion when warm air is supplied to said passage and to position said second ratchet element for selective engagement of its pawls with said serrated portion when cold air is supplied to said passage, means connecting said room temperature responsive element and each of said ratchet elements and adapted to selectively engage one of the pawls of the ratchet element positioned by said second temperature responsive element with said serrated portion thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said serrated portion whereby the two temperature responsive elements control the position of said first means.

8. In an apparatus for controlling the discharge of air from an air supply passage having first and second discharge outlets, a first means having a plurality of positions adapted to restrict in varying degree the discharge of air from said first outlet, driving means including a turbine positioned to be actuated by the movement of air through said second outlet, said driving means being adapted to position said first means in response to the temperature of said room, said driving means comprising a first element mounted for reciprocation, a room temperature responsive element, means controlled by said temperature responsive element and adapted to selectively obstruct movement of said first element in one direction, means tending to impart a reciprocating movement to said first element in response to actuation of said turbine and in opposition to said obstructing means, means adapted to transmit motion from said first element to said first means and means to compensate for heat exchange between said room temperature responsive element and air delivered by said system so that a uniform performance responsive only to room temperature is obtained from said room temperature responsive element without regard to the temperature of air delivered by said passage.

9. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said engageable means, and means operated by said second temperature responsive element and adapted to vary the operative relation between said room temperature responsive element and each ratchet element in response to changes in temperature of air delivered by said passage.

10. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said engageable means, means operated by said second temperature responsive element and adapted to so control the operative relation between said room temperature responsive element and each ratchet element that the room temperature in response to which said room temperature responsive element will operate said first ratchet element is different than the room temperature at which the room temperature responsive element will operate said second ratchet element.

11. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shafe in said first direction in response to said second movement of said room temperature responsive element when positioned by said second temperature responsive element for engagement with said engageable means, and means controlled by said second temperature responsive element and adapted to render inoperative throughout a predetermined range of temperature of air delivered from said passage the pawls which obstruct movement of said discs and shafts in said first direction so that within said range of temperature said shaft and discs are free to move in said second direction while movement thereof in said first direction is opposed thereby positioning said first means so that a maximum amount of air is discharged from said supply passage.

12. An aparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said engageable means, at least one of said pawls being provided with a notch adapted to render said pawl inoperative when aligned with said engageable portion, said second temperature responsive element being adapted to align said notch and said engageable portion when the temperature of air delivered by said passage is within a predetermined range.

13. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said engageable means, at least one of said ratchet elements having associated therewith means to render inoperative one of the pawls of said ratchet element under selected conditions, said second temperature responsive element being adapted to create said selected conditions when the temperature of air delivered by said passage is within a predetermined range.

14. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionaly engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said engageable means, an obstructing member, cooperating means carried by at least one of said ratchet elements and adapted to prevent one of the pawls of the associated ratchet element from engaging with said engageable means when said cooperating means is positioned in operative relation with said obstructing member, said second temperature responsive element being adapted to position said cooperating means and said obstructing member in operative relation when the temperature of air delivered from said passage is within a predetermined temperature range.

15. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a ratchet element, a pair of ratchet pawls carried by said ratchet element and adapted to be selectively engaged with said engageable means, one of said pawls when engaged with said engageable means being adapted to obstruct rotation of said discs and rotatable shaft in a first direction and the other of said pawls when engaged with said engageable means being adapted to obstruct rotation of said discs and rotatable shaft in a second direction, a pair of solenoids adapted by their selective energization to move said ratchet element so that said pawls selectively engage said engageable means, a source of electricity, an electric circuit operatively connecting said solenoids and said source, switch means interposed in said circuit and controlled by said temperature responsive element, said switch means being adapted to energize one of said solenoids when said temperature responsive element moves to a first position and to energize the other solenoid when said temperature responsive element moves to a second position, thereby to selectively obstruct rotation of said discs and rotatable shaft in either direction whereby said first means is positioned by the summation of interrupted movements of said shaft in its unobstructed direction and the duration and direction of movement of said first means is controlled by said temperature responsive element.

16. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a pneumatic room temperature responsive thermostat, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a ratchet element, a pair of ratchet pawls carried by said ratchet element and adapted to be selectively engaged with said engageable means, one of said pawls when engaged with said engageable means being adapted to obstruct rotation of said discs and rotatable shaft in a first direction and the other of said pawls when engaged with said engageable means being adapted to obstruct rotation of said discs and rotatable shaft in a second direction, a pneumatic device operatively associated with said thermostat and adapted to move said ratchet element in a first direction to engage one of said pawls with said engageable means in response to predetermined room temperature conditions, a spring adapted to move said ratchet element in a second direction to engage the other of said pawls with said engageable means under other room temperature conditions, thereby to selectively obstruct rotation of said discs and rotatable shaft in either direction whereby said first means is positioned by the summation of interrupted movements of said shaft in its unobstructed direction and the duration and direction of movement of said first means is controlled by said temperature responsive element.

17. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element positioned at a remote location from said first means, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately frictionally engage said discs to thereby tend to alternately rotate said shaft in a first direction and in a second direction, an engageable means associated with said discs, a ratchet element, a pair of ratchet pawls carried by said ratchet element and adapted to be selectively engaged with said engageable means, one of said pawls when engaged with said engageable means being adapted to obstruct rotation of said discs and rotatable shaft in a first direction and the other of said pawls when engaged with said engageable means being adapted to obstruct rotation of said discs and rotatable shaft in a second direction, means operatively connecting said room temperature responsive element and said ratchet element and adapted to selectively engage said pawls with said engageable means, to selectively obstruct rotation of said discs and rotatable shaft in either direction whereby said first means is positioned by the summation of interrupted movements of said shaft in its unobstructed direction and the duration and direction of movement of said first means is controlled by said temperature responsive element and supplemental means located at a remote distance from said room temperature responsive element and adapted to vary the relationship between said room temperature responsive element and said ratchet element in response to changes in the temperature of air delivered by said passage.

18. An apparatus for controlling the discharge of air from an air supply passage to a room comprising a damper means having a plurality of positions adapted to restrict in varying degree the discharge of air from said supply passage and control means deriving energy from the air discharged from said passage to locate said damper means in different positions, said control means including an air driven turbine associated with said passage, a driven member operably connected to said damper means and adapted to move said damper means in response to movement of said driven member, a drive transmitting means interposed between said turbine and said driven member operable to alternately drive said driven member in a first and second direction and temperature responsive means operable to selectively obstruct movement of said driven member in one of said directions so that the cumulative effect of interrupted movements in the other direction produces a repositioning of said damper means, said drive transmitting means including a mechanism operable to impart an interrupted drive of said driven member at spaced intervals of time so that in the intervals between the interrupted drives of said driven member the rotation of said turbine stores energy for the next successive drive of said driven member.

19. An apparatus for controlling the discharge of air from an air supply passage to a room comprising a first means having a plurality of positions adapted to restrict in varying degree the discharge of air from said supply passage, driving means powered by said air supply and adapted to position said first means in response to the temperature of said room, said driving means comprising a room temperature responsive element, a turbine positioned to be rotated by the movement of air in said passage, a rotatable shaft, means operatively connecting said shaft and said first means, a pair of parallel discs secured to said shaft, an eccentric element positioned between said discs and adapted to be rotated by said turbine and to alternately yieldably engage said discs to thereby tend to alternately rotate said shaft in a first direction and in a second direction, an engageable means associated with said discs, a first ratchet element, a second ratchet element, each of said ratchet elements comprising a pair of pawls adapted to engage said engageable means at a different angle, a second temperature responsive element adapted to position said first ratchet element for selective engagement of its pawls with said engageable means when warm air is supplied to said passage and to position said second ratchet element for selective engagement of its pawls with said engageable means when cold air is supplied to said passage, means connecting said room temperature responsive element and each of said ratchet elements and adapted to selectively engage one of the pawls of the ratchet element positioned by said second temperature responsive element with said engageable means thereby to obstruct rotation of said discs and rotatable shaft in a first direction in response to a first movement of said room temperature responsive element and to obstruct rotation of said discs and rotatable shaft in a second direction in response to a second movement of said room temperature responsive element, the pawls of said other ratchet element being adapted to obstruct rotation of said discs and rotatable shaft in a second direction in response to said first movement of said room temperature responsive element and to obstruct rotation of said discs and rotatable shaft in said first direction in response to said second movement of said room temperature responsive element when positioned by said second temperature responsive element for engagement with said engageable means and the alternate engagement of said discs by said eccentric element being operable to periodically unload said engageable means so that movement of said ratchet elements by said temperature responsive elements is facilitated.

ALWIN B. NEWTON.

REFERENCES CITED

The following references are of record in the file of this patent:

UNITED STATES PATENTS

| Number | Name | Date |
| --- | --- | --- |
| 1,224,614 | Dougan | May 1, 1917 |
| 1,488,225 | Baetz | Mar. 25, 1924 |
| 2,236,249 | Newton | Mar. 25, 1941 |
| 2,415,672 | Campbell | Feb. 11, 1947 |